US012212458B2

(12) United States Patent
Shiraishi et al.

(10) Patent No.: US 12,212,458 B2
(45) Date of Patent: Jan. 28, 2025

(54) COMMUNICATION SYSTEM, CONFIGURATION MANAGEMENT APPARATUS, CONFIGURATION MANAGEMENT METHOD, AND PROGRAM

(71) Applicant: NIPPON TELEGRAPH AND TELEPHONE CORPORATION, Tokyo (JP)

(72) Inventors: Masahiro Shiraishi, Tokyo (JP); Hiroki Nagayama, Tokyo (JP); Tomoaki Washio, Tokyo (JP); Asami Miyajima, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/551,715

(22) PCT Filed: Apr. 1, 2021

(86) PCT No.: PCT/JP2021/014228
§ 371 (c)(1),
(2) Date: Sep. 21, 2023

(87) PCT Pub. No.: WO2022/208854
PCT Pub. Date: Oct. 6, 2022

(65) Prior Publication Data
US 2024/0097975 A1    Mar. 21, 2024

(51) Int. Cl.
*G06F 15/16*    (2006.01)
*H04L 41/02*    (2022.01)
*H04L 41/0806*    (2022.01)

(52) U.S. Cl.
CPC .......... *H04L 41/0806* (2013.01); *H04L 41/02* (2013.01)

(58) Field of Classification Search
CPC ............................ H04L 41/02; H04L 41/086
(Continued)

(56) References Cited

U.S. PATENT DOCUMENTS

| 7,120,680 B1 * | 10/2006 | Higgins | .................. H04L 41/12 |
| | | | 709/230 |
| 8,687,959 B2 * | 4/2014 | Muppidi | ............... H04J 14/025 |
| | | | 398/30 |

(Continued)

OTHER PUBLICATIONS

DDS Foundation "What's in the DDS Standard?", Internet [retrieved on Sep. 20, 2023] (the Internet) <URL: https://www.dds-foundation.org/omg-dds-standard/>.

*Primary Examiner* — Moustafa M Meky
(74) *Attorney, Agent, or Firm* — IPUSA, PLLC (57) ABSTRACT

A communication system that performs communication among a plurality of nodes by a broker-less type publishing/subscribing model, the communication system including a computer including a memory and a processor configured to receive communication data among the plurality of nodes; based on the communication data, create first relationship information indicating a relationship among the nodes regarding transmission and reception of the communication data, second relationship information indicating a relationship among the nodes regarding a belonging domain and whether the nodes are on a publisher side or on a subscriber side, and third relationship information indicating a relationship among the nodes regarding a topic to be published and subscribed; and create configuration information indicating a network configuration of the communication system by associating the first relationship information, the second relationship information, and the third relationship information.

8 Claims, 7 Drawing Sheets

(58) Field of Classification Search
USPC .......................................................... 709/222
See application file for complete search history.

(56) References Cited

U.S. PATENT DOCUMENTS

| | | | | |
|---|---|---|---|---|
| 10,079,711 | B1* | 9/2018 | Hayes | H04L 41/0895 |
| 10,476,805 | B2* | 11/2019 | Lin | H04L 41/0895 |
| 10,942,930 | B2* | 3/2021 | Kemme | G06F 16/24578 |
| 11,088,919 | B1* | 8/2021 | Chandrashekhar | H04L 41/044 |
| 11,258,668 | B2* | 2/2022 | Chandrashekhar | H04L 63/0209 |
| 11,438,238 | B2* | 9/2022 | Chandrashekhar | H04L 41/02 |
| 11,882,000 | B2* | 1/2024 | Chandrashekhar | H04L 41/0846 |
| 2009/0304381 | A1* | 12/2009 | Muppidi | H04J 14/0267 398/9 |
| 2013/0305048 | A1* | 11/2013 | Yao | H04L 63/0428 713/168 |
| 2017/0289052 | A1* | 10/2017 | Lin | H04L 45/50 |
| 2021/0314225 | A1* | 10/2021 | Chandrashekhar | H04L 41/085 |
| 2021/0314235 | A1* | 10/2021 | Chandrashekhar | H04L 41/044 |

* cited by examiner

COMMUNICATION SYSTEM, CONFIGURATION MANAGEMENT APPARATUS, CONFIGURATION MANAGEMENT METHOD, AND PROGRAM

TECHNICAL FIELD

The present invention relates to a technology for managing configuration information of a communication system that performs Pub/Sub communication.

BACKGROUND ART

In recent years, in order to implement a smart factory, devices on an information network (NW) and devices on a control NW are connected. In the future, a communication model that performs device interconnection and one-to-many, many-to-one communication in a lightweight and flexible manner is expected to be widespread.

A Publish/Subscribe communication (hereinafter, Pub/Sub communication) model has been proposed as a lightweight and flexible communication model as described above. In Pub/Sub communication, there are a Publisher, which is a client on a side on which a message called an event is created and transmitted (distributed), and a Subscriber, which is a client on a side on which the message is received (subscribed).

The Pub/sub communication has three properties of "spatial separation", "temporal separation", and "asynchronous processing". Due to the "spatial separation", the Publisher and the Subscriber do not need to know existence of each other. The "temporal separation" enables transmission and reception of data even in a case where the Publisher and the Subscriber do not exist on the network at the same time. Furthermore, by the "asynchronous processing", transmission and reception of an event can be performed asynchronously with other processing of the Publisher or the Subscriber.

The Pub/Sub communication model includes a broker type and a broker-less type. The configuration of the broker type is a configuration in which functions called a broker responsible for properties of the spatial separation, the temporal separation, and the asynchronous processing is arranged between the Pub and the Sub. The configuration of the broker-less type is a distributed configuration in which all nodes (Pub and Sub) include functions responsible for the properties of the spatial separation, the temporal separation, and the asynchronous processing. By providing a function called data distribution service (DDS) in each of the nodes, the above-described broker-less type configuration can be implemented. Note that the Pub/Sub communication model is also referred to as a publishing/subscribing model.

CITATION LIST

Non-Patent Literature

Non-Patent Literature 1: What's in the DDS Standard, Internet <URL: https://www.dds-foundation.org/omg-dds-standard/>

SUMMARY OF INVENTION

Technical Problem

However, in a communication system that performs Pub/Sub communication using the DDS, data transmission and reception relationship among Pubs and Subs cannot be grasped only at an Internet Protocol (IP) level. This is because distribution by multicast, existence of a plurality of domains, distribution/subscription by topic classification, and the like are performed in Pub/Sub communication using the DDS.

For this reason, in a communication system that performs Pub/Sub communication using the DDS, management of the configuration information has been difficult.

The present invention has been made in view of the above points, and an object thereof is to provide a technology that enables management of configuration information of a communication system that performs Pub/Sub communication.

Solution to Problem

According to the disclosed technology, a communication system is provided that performs communication among a plurality of nodes by a broker-less type publishing/subscribing model, the communication system including:

a reception unit that receives communication data among the plurality of nodes, a creation unit that, based on the communication data, creates first relationship information indicating a relationship among the nodes regarding transmission and reception of the communication data, second relationship information indicating a relationship among the nodes regarding a belonging domain and whether the nodes are on a publisher side or on a subscriber side, and third relationship information indicating a relationship among the nodes regarding a topic to be published and subscribed; and a combining unit that creates configuration information indicating a network configuration of the communication system by associating the first relationship information, the second relationship information, and the third relationship information.

Advantageous Effects of Invention

According to the disclosed technology, a technology is provided that enables management of configuration information of a communication system that performs Pub/Sub communication.

DESCRIPTION OF EMBODIMENTS

Hereinafter, an embodiment of the present invention (present embodiment) will be described with reference to the drawings. The embodiment described below is only an example, and an embodiment to which the present invention is applied is not limited to the following embodiment.

In the embodiment described below, an example in which the present invention is applied to a communication system that performs Pub/Sub communication using DDS will be described, but the present invention is applicable not only to the Pub/Sub communication using the DDS.

(Pub/Sub Communication Using DDS)

First, DDS and Pub/Sub communication using the DDS as premises of the present embodiment will be described.

In the present embodiment, the above-described broker-less type configuration is employed, and the DDS includes a function corresponding to a broker, thereby implementing the broker-less type.

Here, delivery range management in the DDS will be described. In the DDS, a delivery NW is added to an NW I/F of a node. A delivery range set by a user is operated by this delivery NW and a filter inside the DDS, and enables transmission and reception of data appropriate for an application functioning as a Pub or a Sub.

Specifically, in the DDS, based on a data bus and the delivery range set by the user, a multicast address is assigned to the NW I/F that can be used in nodes, and the delivery NW is prepared. Whether to perform distribution by unicast using an existing IP address of a node or by a newly assigned multicast address can also be set when the delivery range is designated, and thus a physical data distribution range can be defined.

Figure 1:
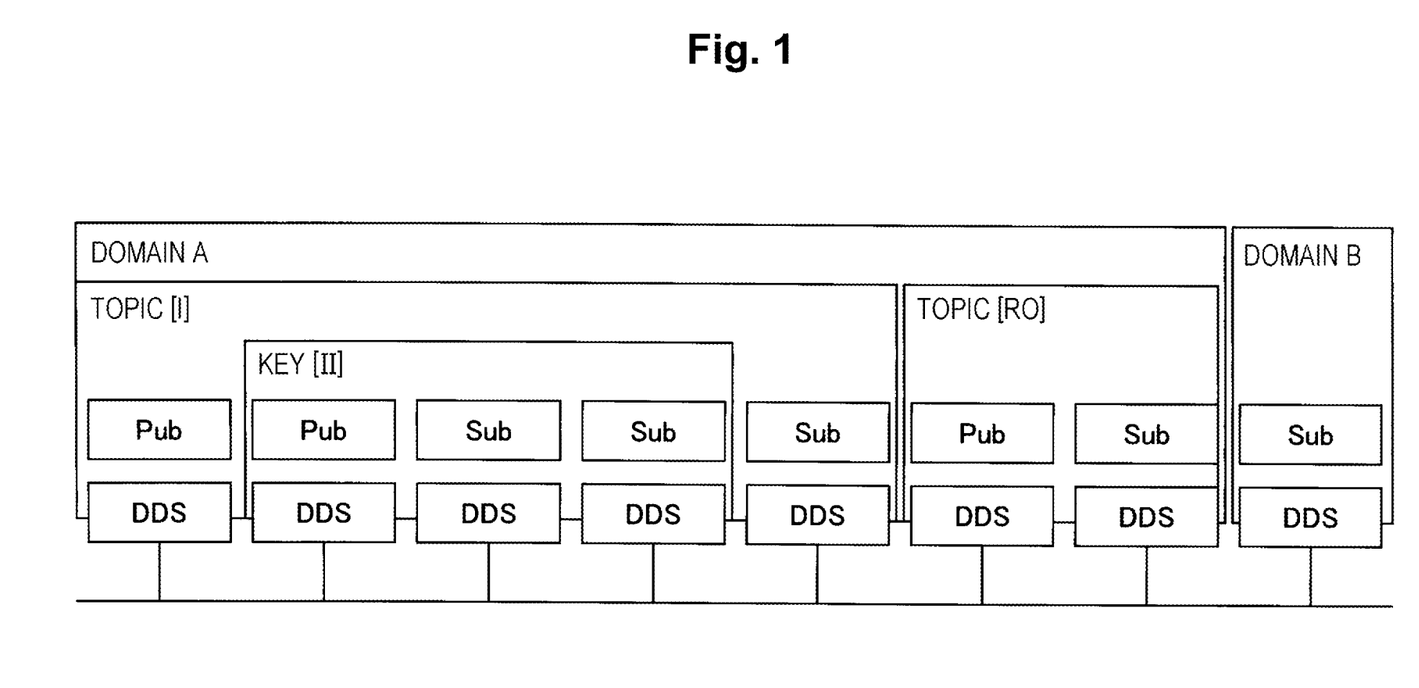
FIG. 1 is a diagram for describing Pub/Sub communication using DDS.

FIG. 1 illustrates an example of delivery ranges. In the example of FIG. 1, a domain A and a domain B are set as the delivery ranges. Furthermore, in the domain A, a delivery range for a topic [i] and a delivery range for a topic [ro] are set. Furthermore, a delivery range of a key [II] is set within the delivery range of the topic [i].

(System Configuration Example in which DDS is Incorporated)

The DDS is a program that functions as middleware in a node (may be referred to as a computer, a communication device, or the like). A processing program as a base necessary for communication in the DDS is prepared as a library. A DDS program can be generated using this library from a data definition file for communication program generation including, as parameters, definitions (type, size, name, QoS, and the like) of data transmitted by an application (described as "APP"). Generation of the DDS itself is an existing technology.

Figure 2:
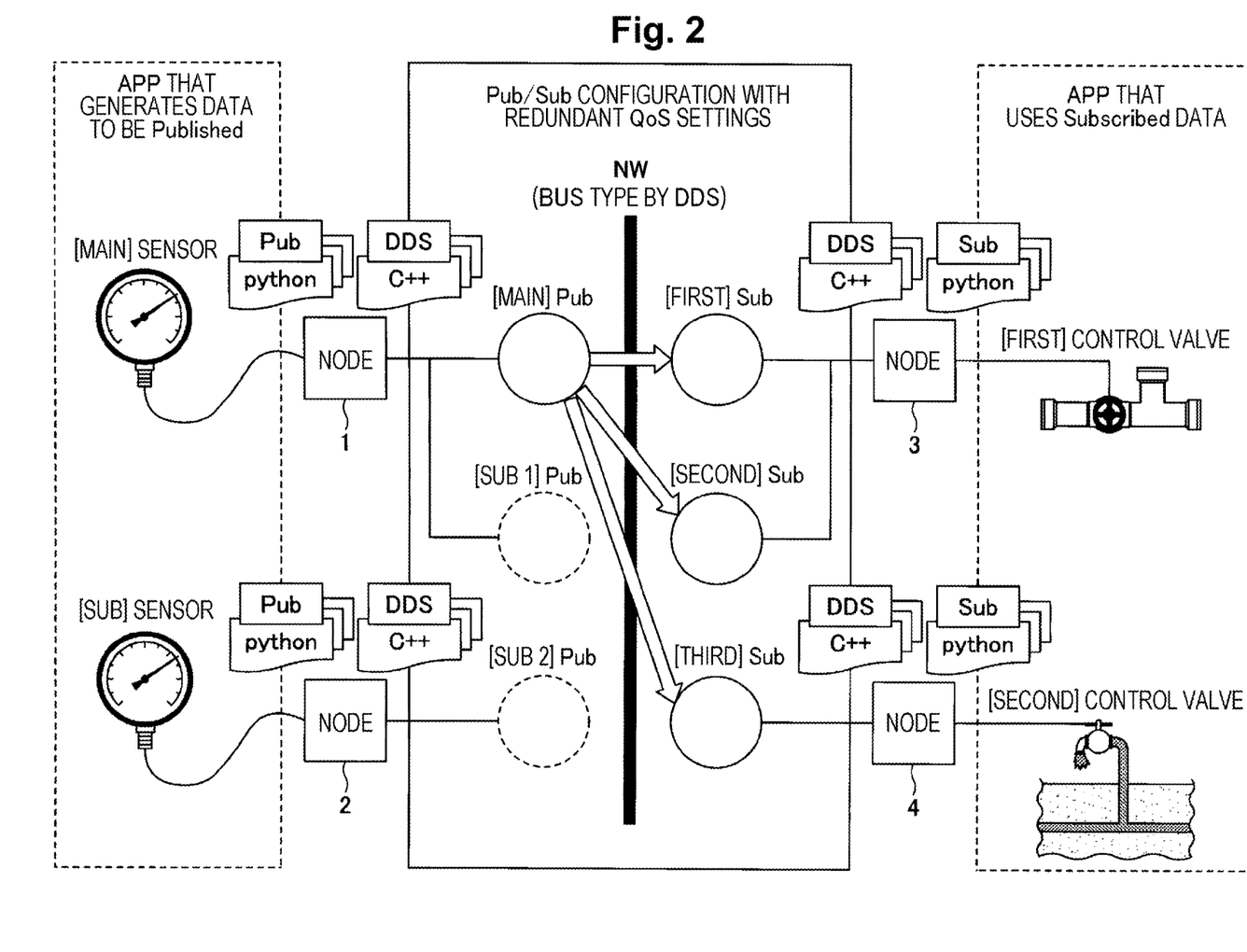
FIG. 2 is a diagram illustrating a system configuration example in which the DDS is incorporated.

FIG. 2 is a diagram illustrating a system configuration example in which the DDS is incorporated. FIG. 2 physically illustrates a configuration in which a plurality of nodes (computers) to which sensors and control valves are connected is connected to a logical bus network.

A sensor is connected to each of nodes 1 and 2, and an APP that generates data to be published and the DDS are mounted on each of the nodes 1 and 2. A control valve is connected to each of nodes 2 and 3, on which an APP that uses subscribed data and the DDS are mounted.

The example of FIG. 2 illustrates an example in which a Pub/Sub configuration with redundant QoS settings is implemented by the DDS. Specifically, the DDS of the node 1 configures a main Pub and a sub 1 Pub, and the DDS of the node 2 configures a sub 2 Pub. Furthermore, the DDS of the node 3 configures a first Sub and a second Sub, and the DDS of the node 4 configures a third Sub.

Note that, in the example of FIG. 2, an example in which APPs are described in python and the DDS is described in C++ is illustrated, but these are merely examples, and the APPs may be described in any program language. Furthermore, in a case where the Pub/Sub configuration is changed, there are changes that can be done partially and dynamically such as QoS, and changes that require restart of a process (including modification of a program).

Hereinafter, an example will be described as an example of the technology according to the present embodiment.

(System Configuration Example in Example)

First, an example of a communication system in the present example will be described. In the communication system in the present example, one node may belong to a plurality of domains. Furthermore, a plurality of Pubs/Subs may exist in one node. Note that, here, the Pub is an application that generates data to be published, and the Sub is an application that uses subscribed data. The functions related to the Pub/Sub communication are performed by the DDS.

Furthermore, both a Pub/Sub may exist in one node, and a Pub/Sub across a plurality of domains may exist in one node. Furthermore, a plurality of Pubs or a plurality of Subs may exist in one APP. Furthermore, the Pubs or the Subs in the same APP can be distinguished from one another. Furthermore, in the communication system in the present example, communication is plain text.

Figure 3:
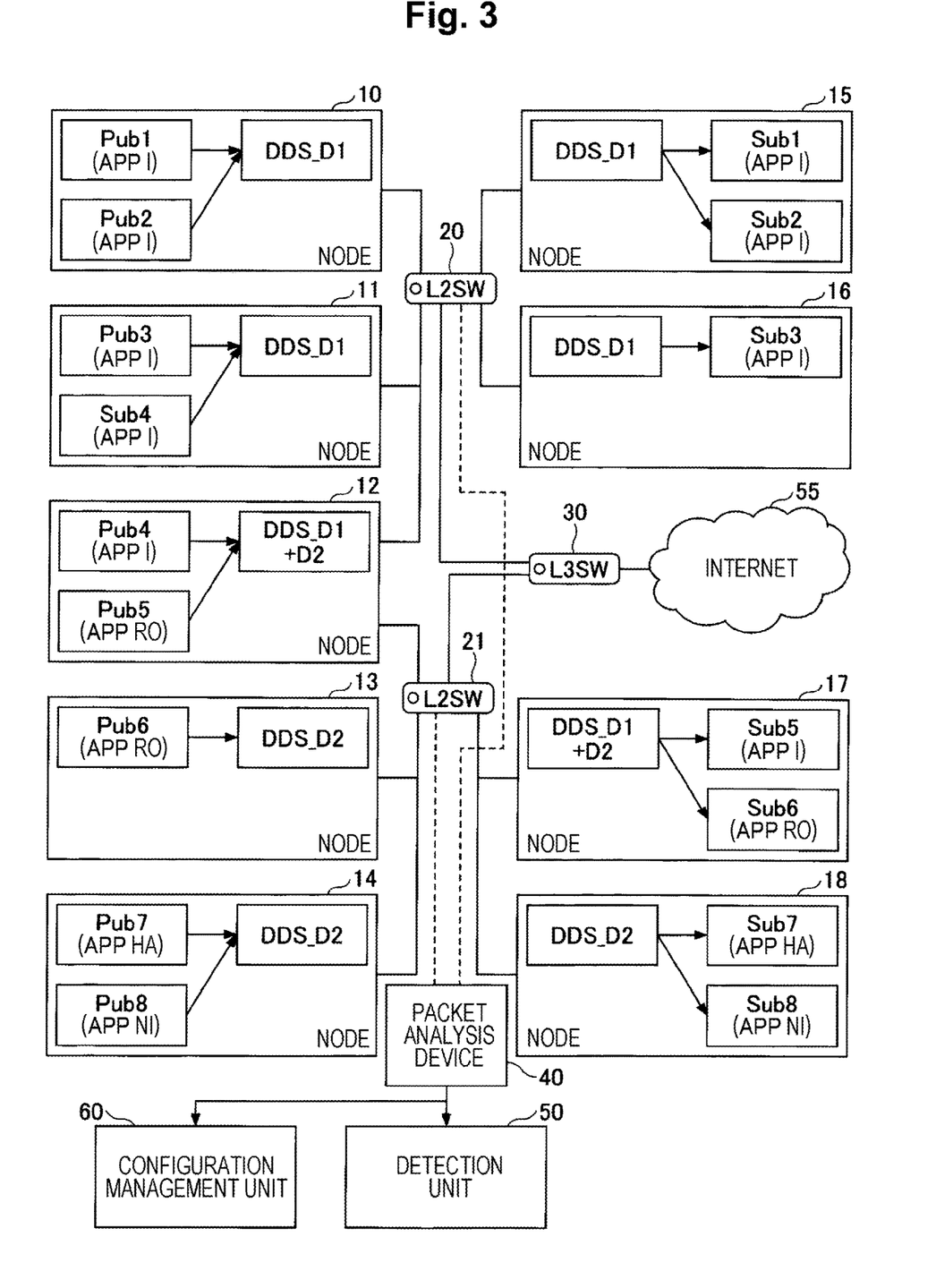
FIG. 3 is a diagram illustrating a system configuration example in an example.

FIG. 3 illustrates a configuration example of the communication system in the present example. As illustrated in FIG. 3, the communication system includes nodes 10 to 18, L2SWs (layer 2 switches) 20 and 21, an L3SW (layer 3 switch) 30, a packet analysis device 40, and a detection unit 50.

In the example of FIG. 3, the nodes 10, 11, 12, 15, 16, and 17 belong to a domain D1, and the nodes 12, 13, 17, and 18 belong to a domain D2. For example, a domain to which a node belongs is indicated as D1 in "DDS_D1" of the node 10. The node 12 and the node 17 belong to both the domain D1 and the domain D2.

For example, in the node 10, a "Pub1 (APP i)" is an application for publishing data of a topic [i], and functions as a Pub1 (Publisher1) in the Pub/Sub communication. In the node 10, there are two Pubs of the Pub1 (APP i) and a Pub2 (APP i). This indicates that there is one APP but the function of the DDS enables the one APP to function as the two Pubs. The same applies to a Sub as indicated in the node 15.

Furthermore, the node 11 includes both a Pub and a Sub of a Pub3 and a Sub4. There is a plurality of APPs that functions as a plurality of Pubs in the nodes 12 and 14, and there is a plurality of APPs that functions as a plurality of Subs in the nodes 17 and 18.

Furthermore, the Internet 55 is connected to an end of the L3SW 30, and each node can communicate with the Internet 55. Furthermore, the packet analysis device 40 is connected to the L2SWs 20 and 21, and the detection unit 50 can perform anomaly detection or a configuration management unit 60 can perform configuration management based on a result of packet analysis. Note that the detection unit 50 and the configuration management unit 60 may be included in the packet analysis device 40 or may be included in a device different from the packet analysis device 40. In the present example, it is assumed that the packet analysis device 40 includes the detection unit 50 and the configuration management unit 60.

(Configuration Management)

As described above, in a communication system that performs Pub/Sub communication using the DDS, since data transmission and reception relationship among Pubs and Subs cannot be grasped only at an IP level, managing configuration information (NW configuration information) of the communication system is difficult. Therefore, in the present example, configuration information is made to be manageable by combining a plurality of items of relationship information that can be created from communication (traffic) flowing among the nodes.

As the relationship information, three layers of an "IP relationship layer", a "participant relationship layer", and a "Pub/Sub relationship layer" representing topology of the horizontal axis of the NW are created. Since the IP relationship layer and the participant relationship layer are associated with each other and the participant relationship layer and the Pub/Sub relationship layer are associated with each other, all the three layers are eventually associated with each other, and by combining these three layers, a "combined layer" representing topology of the vertical axis of the NW is obtained. Configuration information is managed by holding the combined layer for a plurality of generations. Note that a generation refers to, for example, a division obtained by performing division by a certain time interval, an event interval, or the like.

Figure 4:
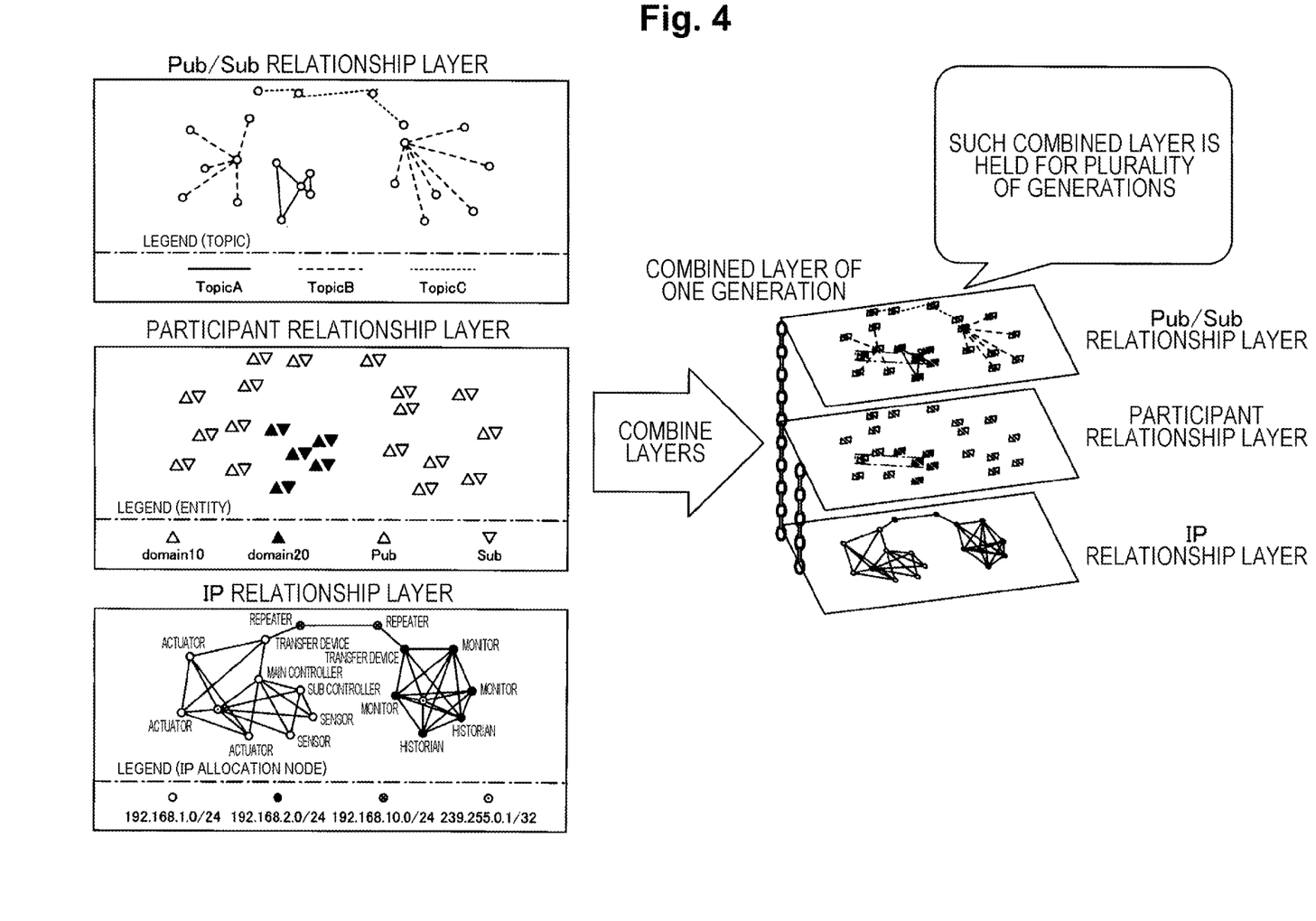
FIG. 4 is a diagram for describing configuration management.

FIG. 4 illustrates an example of the IP relationship layer, the participant relationship layer, the Pub/Sub relationship layer, and the combined layer. As illustrated in FIG. 4, the IP relationship layer is represented by a graph structure in which IP addresses are vertices and transmission and reception relationships of data at an IP level are edges. In the IP relationship layer, in a case where there is an edge between vertices, it indicates that there is a data transmission and reception relationship between nodes including IP addresses represented by the vertices. Note that one node may have a plurality of IP addresses (for example, an IP address for multicast may be included in addition to an IP address for unicast). The participant relationship layer represents a globally unique identifier (GUID) of a node using one symbol (triangular or inverted triangular symbol), and each symbol represents whether the domain to which each GUID belongs is a Pub or a Sub. The Pub/Sub relationship layer includes GUIDs of the nodes as vertices and relationships of whether the nodes belong to the same topics as edges, and represents relationships of topics to which the GUIDs belong. Note that the participant relationship layer is also represented by a graph structure including the above symbols (triangular or inverted triangular symbols) as vertices. In the example of FIG. 4, there is no edge in the graph structure representing the participant relationship layer, but for example, vertices belonging to the same domains may be connected by edges.

The Pub/Sub relationship layer can be created using information acquired from communication as data distribution, and the participant relationship layer can be created using information acquired from communication for DDS operation. Meanwhile, the IP relationship layer can be created using information acquired from both communication as data distribution and communication for DDS operation. Note that the communication for DDS operation is communication performed in a case where a node participates in the Pub/Sub communication; communication performed in a case where another node is searched for; communication performed in a case where distribution contents are agreed; and the like.

In the IP relationship layer, one vertex is associated with a 5-tuple including an IP address of a node (src/dst IP addresses, src/dst port numbers, protocol number). In the participant relationship layer, a GUID and a port number are associated with one symbol (triangular or inverted triangular symbol). In the Pub/Sub relationship layer, a GUID and a topic name are associated with one vertex. The GUID is an identifier used in the DDS, and is generated from an IP address, a port number, and the like. Note that one node may include a plurality of GUIDs (for example, in a case where one node functions as both a Pub and a Sub; in a case where one node belongs to a plurality of domains or a plurality of topics; and the like).

Therefore, the IP relationship layer can be associated with the participant relationship layer using port numbers, and the participant relationship layer can be associated with the Pub/Sub relationship layer using GUIDs. By combining the three layers being combined by these associations, the combined layer is obtained as the NW configuration information of the communication system that performs Pub/Sub communication. This combined layer is held, for example, for a plurality of generations.

Here, in a case of focusing on one node in the combined layer, one or more vertices of the IP relationship layer (5-tuple including IP addresses) correspond to this node, and one or more vertices of the participant relationship layer (port numbers and GUIDs) are associated with the one or more vertices. Furthermore, zero or more vertices of the Pub/Sub relationship layer (GUIDs and topic names) are associated with the one or more vertices of the participant relationship layer. That is, in the combined layer, for each node, a tree structure having the node as a vertex (a tree structure in which the highest hierarchy level represents the IP address, the next hierarchy level represents the port number, the next hierarchy level represent the GUID, and the lowest hierarchy level represents the topic name) is obtained, and the tree structure represents vertical axis topology.

(Configuration Example of Present Example)

Figure 5:
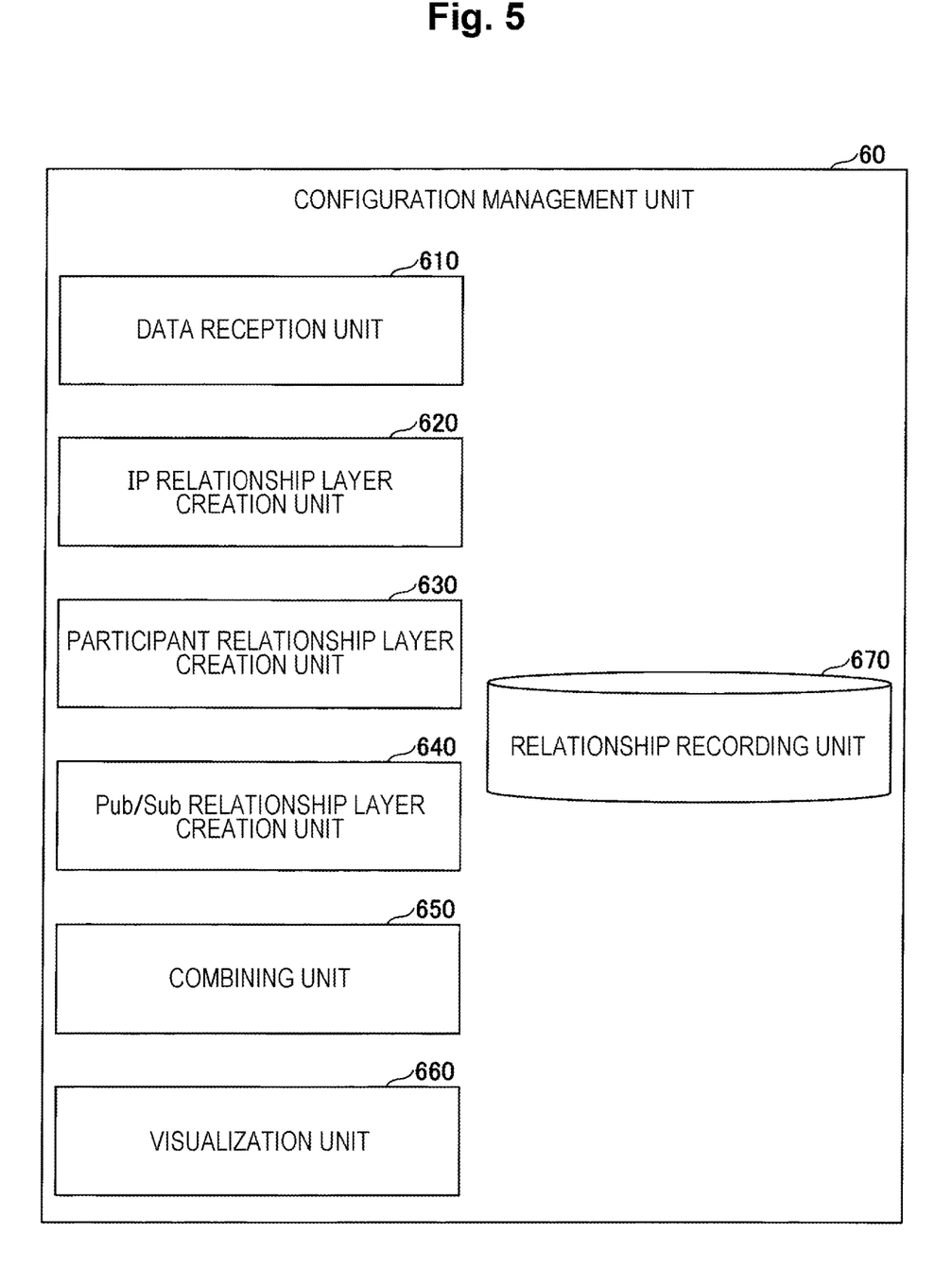
FIG. 5 is a diagram illustrating a configuration example of a configuration management unit in the example.

In the present example, a mechanism for performing the above-described configuration management is provided. FIG. 5 illustrates a configuration example of the configuration management unit 60. As illustrated in FIG. 5, the configuration management unit 60 includes a data reception unit 610, an IP relationship layer creation unit 620, a participant relationship layer creation unit 630, a Pub/Sub relationship layer creation unit 640, a combining unit 650, a visualization unit 660, and a relationship recording unit 670. Operation of each unit and the like will be described in a sequence to be described below. In the present example, after the above-described three layers are created by these units, these three layers are combined to create a combined layer. As a result, management of the NW configuration information of a communication system that performs Pub/Sub communication is implemented.

(Sequence Example of Present Example)

Figure 6:
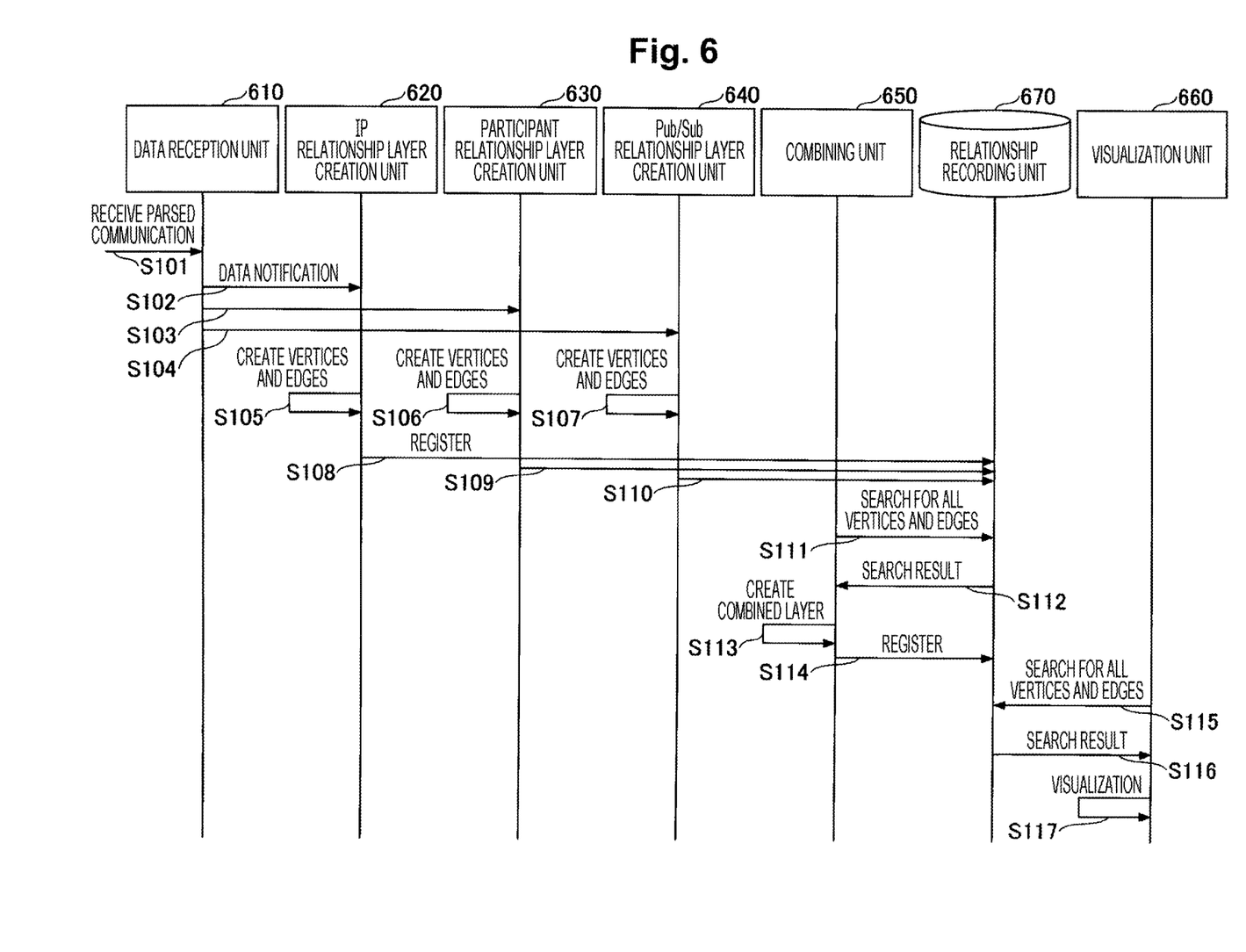
FIG. 6 is a diagram illustrating a processing flow in the example.

Next, an operation example of the packet analysis device 40 including the configuration management unit 60 in the present example will be described with reference to a sequence diagram of FIG. 6. Note that, in the example of FIG. 6, a case where a combined layer of one generation is created will be described.

Upon receiving parsed communication (data), the data reception unit 610 notifies the IP relationship layer creation unit 620, the participant relationship layer creation unit 630, and the Pub/Sub relationship layer creation unit 640 of the data (S101 to S104). The communication is parsed by an existing function that the packet analysis device 40 includes. Note that, every time parsed communication (data) is received, the data reception unit 610 notifies the data to the IP relationship layer creation unit 620, the participant relationship layer creation unit 630, and the Pub/Sub relationship layer creation unit 640.

Regardless of whether the above communication is Communication for DDS operation or communication as data distribution, the IP relationship layer creation unit 620 creates vertices and edges of an IP relationship layer from this communication (data) (S105). On the other hand, in a case where the communication is Communication for DDS operation, the participant relationship layer creation unit 630 creates vertices and edges of a participant relationship layer from this communication (data) (S106). Furthermore, in a case where the above communication is communication as data distribution, the Pub/Sub relationship layer creation unit 640 creates vertices and edges of the Pub/Sub relationship layer from this communication (data) (S107).

In a case where one generation of time has elapsed (for example, in a case where a certain period of time has elapsed or in a case where a certain event has occurred), the IP relationship layer creation unit 620, the participant relationship layer creation unit 630, and the Pub/Sub relationship layer creation unit 640 register the vertices and the edges created in the above in the relationship recording unit 670 (S108 to S110). As a result, the IP relationship layer represented by a graph structure of the vertices and the edges created in above S105, the participant relationship layer represented by a graph structure of the vertices and the edges created in above S106, and the Pub/Sub relationship layer represented by a graph structure of the vertices and the edges created in above S107 are recorded in the relationship recording unit 670. Note that, as described above, these layers represent the horizontal axis topology of the NW configuration of the communication system that performs Pub/Sub communication.

Subsequently, the combining unit 650 searches in the relationship recording unit 670 for all the vertices and the edges of each of the layers related to the generation, and receives a search result (S111 to S112). That is, the combining unit 650 receives the IP relationship layer, the participant relationship layer, and the Pub/Sub relationship layer of the generation as the search result. Thereafter, the combining unit 650 combines the received layers to create a combined layer, and registers the combined layer in the relationship recording unit 670 (S113 to S114). As a result, the combined layer representing both the vertical axis topology and the horizontal axis topology of the NW configuration of the communication system that performs Pub/Sub communication is recorded in the relationship recording unit 670.

Note that, in above S108 to S110 and S114, layers of the oldest generation may be deleted. For example, in a case where layers of N generations (IP relationship layers, participant relationship layers, Pub/Sub relationship layers, and combined layers) are held and layers of N generations have already been recorded at the time of registration in above S108 to S110 and S114, the layers of the oldest generation are deleted.

In a case of visualizing the NW configuration of the communication system that performs Pub/Sub communication, the visualization unit 660 designates a corresponding generation, searches in the relationship recording unit 670 for all vertices and edges of a combined layer related to this generation, and receives a search result (S115 to S116). Then, the visualization unit 660 visualizes the combined layer represented by a graph structure of the received vertices and edges (S117). Note that the visualization unit 660 may visualize the combined layer, for example, on a terminal of a user or the like (for example, an NW configuration of vertical axis and horizontal axis topology represented by the combined layer is visualized in a three-dimensional space). Accordingly, the user can grasp the NW configuration of the communication system that performs Pub/Sub communication, and can manage the NW configuration.

Note that although, in the present example, processing of above S108 to S110 are performed even in a case where layers representing the same relationship in the same generation (IP relationship layer, participant relationship layer, Pub/Sub relationship layer) have already been registered in the relationship recording unit 670, the processing may not be performed in a case where layers representing the same relationship have already been registered from the viewpoint of reducing the processing load and the like. Similarly, processing of above S111 to S114 may not be performed in a case where the processing of above S108 to S110 is not performed (that is, in a case where none of an IP relationship layer, a participant relationship layer, and a Pub/Sub relationship layer is newly registered).

(Hardware Configuration Example)

The packet analysis device 40 including the configuration management unit 60 in the present embodiment can be implemented, for example, by causing a computer to perform a program in which the processing contents described in the present embodiment are described.

The above program may be recorded in a computer-readable recording medium (such as a portable memory) to be stored and distributed. Also, the program may be provided through a network such as the Internet or an electronic mail.

Figure 7:
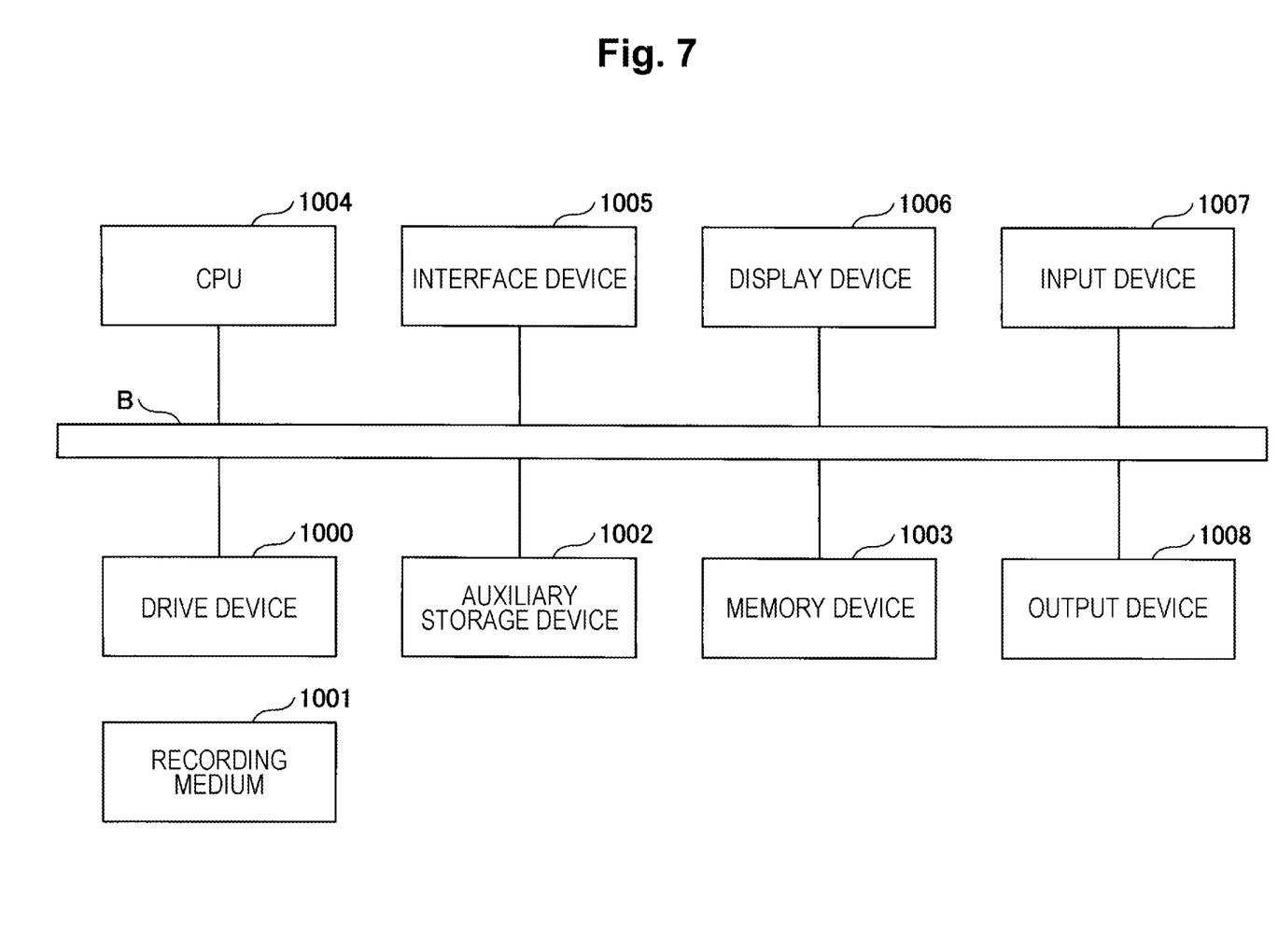
FIG. 7 is a diagram illustrating a hardware configuration example of devices.

FIG. 7 is a diagram illustrating a hardware configuration example of the above computer. The computer of FIG. 7 includes a drive device 1000, an auxiliary storage device 1002, a memory device 1003, a CPU 1004, an interface device 1005, a display device 1006, an input device 1007, an output device 1008, and the like, which are connected to each other by a bus B.

The program for performing processes in the computer is provided through a recording medium 1001 such as a CD-ROM or a memory card, for example. When the recording medium 1001 that stores the program is set in the drive device 1000, the program is installed from the recording medium 1001 into the auxiliary storage device 1002 via the drive device 1000. However, the program is not necessarily installed from the recording medium 1001, and may be downloaded from another computer via a network. The auxiliary storage device 1002 stores the installed program, and also stores necessary files, data, and the like.

In a case where an instruction to start the program is issued, the memory device 1003 reads the program from the auxiliary storage device 1002, and stores the program therein. The CPU 1004 implements functions related to the configuration management unit 60 according to the program stored in the memory device 1003. The interface device 1005 is used as an interface for connection to the network. The display device 1006 displays a graphical user interface (GUI) or the like according to the program. The input device 1007 includes a keyboard and a mouse, buttons, a touch panel, or the like, and is used to input various operation instructions. The output device 1008 outputs a calculation result. Note that the packet analysis device 40 may not include either or both of the display device 1006 and the input device 1007.

Effect of Embodiment

According to the technology of the present embodiment, configuration information of a communication system that performs Pub/Sub communication using DDS can be managed.

Summary of Embodiment

The present description discloses at least a communication system, a configuration management apparatus, a configuration management method, and a program described in the following clauses.
(Clause 1)
A communication system that performs communication among a plurality of nodes by a broker-less type publishing/subscribing model, the communication system including:
 a reception unit that receives communication data among the plurality of nodes;
 a creation unit that, based on the communication data, creates first relationship information indicating a relationship among the nodes regarding transmission and reception of the communication data, second relationship information indicating a relationship among the nodes regarding a belonging domain and whether the nodes are on a publisher side or on a subscriber side, and third relationship information indicating a relationship among the nodes regarding a topic to be published and subscribed; and
 a combining unit that creates configuration information indicating a network configuration of the communication system by associating the first relationship information, the second relationship information, and the third relationship information.
(Clause 2)
The communication system according to the clause 1,
 in which the combining unit creates the configuration information by associating the first relationship information and the second relationship information by port numbers, and associating the second relationship information and the third relationship information by identifiers used in the publishing/subscribing model.
(Clause 3)
The communication system according to the clause 1 or 2,
 in which the creation unit creates the first relationship information and the third relationship information based on communication data as data distribution among the nodes, and
 creates the first relationship information and the second relationship information based on communication data among the nodes in a case where a node participates in the communication system, communication data among the nodes in a case where another node is searched for, or communication data among the nodes in a case where a distribution content is agreed.
(Clause 4)
A configuration management apparatus that creates configuration information of a communication system that performs communication among a plurality of nodes by a broker-less type publishing/subscribing model, the configuration management apparatus including:
 a reception unit that receives communication data among the plurality of nodes;
 a creation unit that, based on the communication data, creates first relationship information indicating a relationship among the nodes regarding transmission and reception of the communication data, second relationship information indicating a relationship among the nodes regarding a belonging domain and whether the nodes are on a publisher side or on a subscriber side, and third relationship information indicating a relationship among the nodes regarding a topic to be published and subscribed; and
 a combining unit that creates configuration information indicating a network configuration of the communication system by associating the first relationship information, the second relationship information, and the third relationship information.
(Clause 5)
The configuration management apparatus according to the clause 4,
 in which the combining unit creates the configuration information by associating the first relationship information and the second relationship information by port numbers, and associating the second relationship information and the third relationship information by identifiers used in the publishing/subscribing model.
(Clause 6)
The configuration management apparatus according to the clause 4 or 5,
 in which the creation unit creates the first relationship information and the third relationship information based on communication data as data distribution among the nodes, and
 creates the first relationship information and the second relationship information based on communication data among the nodes in a case where a node participates in the communication system, communication data among the nodes in a case where another node is searched for, or communication data among the nodes in a case where a distribution content is agreed.
(Clause 7)
A configuration management method performed by a configuration management apparatus that creates configuration information of a communication system that performs communication among a plurality of nodes by a broker-less type publishing/subscribing model, the configuration management method including:
 a reception step for receiving communication data among the plurality of nodes;
 a creation step for, based on the communication data, creating first relationship information indicating a relationship among the nodes regarding transmission and reception of the communication data, second relationship information indicating a relationship among the nodes regarding a belonging domain and whether the nodes are on a publisher side or on a subscriber side, and third relationship information indicating a relationship among the nodes regarding a topic to be published and subscribed; and
 a combining step for creating configuration information indicating a network configuration of the communication system by associating the first relationship information, the second relationship information, and the third relationship information.
(Clause 8)
A program causing a computer to function as the configuration management apparatus according to any one of clauses 4 to 6.

Although the present embodiment has been described above, the present invention is not limited to such a specific embodiment, and various modifications and changes can be made within the scope of the present invention disclosed in the claims.

REFERENCE SIGNS LIST 10 to 18 Node
20, 21 L2SW
30 L3SW
40 Packet analysis device
50 Detection unit
55 Internet
60 Configuration management unit
610 Data reception unit
620 IP relationship layer creation unit
630 Participant relationship layer creation unit
640 Pub/Sub relationship layer creation unit
650 Combining unit
660 Visualization unit
670 Relationship recording unit
1000 Drive device
1001 Recording medium
1002 Auxiliary storage device
1003 Memory device
1004 CPU
1005 Interface device
1006 Display device
1007 Input device
1008 Output device

The invention claimed is:

1. A communication system that performs communication among a plurality of nodes by a broker-less type publishing/subscribing model, the communication system comprising:
a computer including a memory and a processor configured to
receive communication data among the plurality of nodes;
based on the communication data, create first relationship information indicating a relationship among the nodes regarding transmission and reception of the communication data, second relationship information indicating a relationship among the nodes regarding a belonging domain and whether the nodes are on a publisher side or on a subscriber side, and third relationship information indicating a relationship among the nodes regarding a topic to be published and subscribed; and
create configuration information indicating a network configuration of the communication system by associating the first relationship information, the second relationship information, and the third relationship information.

2. The communication system according to claim 1,
wherein the processor creates the configuration information by associating the first relationship information and the second relationship information by port numbers, and associating the second relationship information and the third relationship information by identifiers used in the publishing/subscribing model.

3. The communication system according to claim 1,
wherein the processor creates the first relationship information and the third relationship information based on communication data as data distribution among the nodes, and
creates the first relationship information and the second relationship information based on communication data among the nodes in a case where a node participates in the communication system, communication data among the nodes in a case where another node is searched for, or communication data among the nodes in a case where a distribution content is agreed.

4. A configuration management apparatus that creates configuration information of a communication system that performs communication among a plurality of nodes by a broker-less type publishing/subscribing model, the configuration management apparatus comprising:
a memory; and
a processor configured to
receive communication data among the plurality of nodes;
based on the communication data, create first relationship information indicating a relationship among the nodes regarding transmission and reception of the communication data, second relationship information indicating a relationship among the nodes regarding a belonging domain and whether the nodes are on a publisher side or on a subscriber side, and third relationship information indicating a relationship among the nodes regarding a topic to be published and subscribed; and
create configuration information indicating a network configuration of the communication system by associating the first relationship information, the second relationship information, and the third relationship information.

5. The configuration management apparatus according to claim 4,
wherein the processor creates the configuration information by associating the first relationship information and the second relationship information by port numbers, and associating the second relationship information and the third relationship information by identifiers used in the publishing/subscribing model.

6. The configuration management apparatus according to claim 4,
wherein the creation unit processor creates the first relationship information and the third relationship information based on communication data as data distribution among the nodes, and
creates the first relationship information and the second relationship information based on communication data among the nodes in a case where a node participates in the communication system, communication data among the nodes in a case where another node is searched for, or communication data among the nodes in a case where a distribution content is agreed.

7. A non-transitory computer-readable recording medium having computer-readable instructions stored thereon, which, when executed, cause a computer including a memory and processor to function as the configuration management apparatus according to claim 4.

8. A configuration management method performed by a configuration management apparatus that includes a memory and a processor to create configuration information of a communication system that performs communication among a plurality of nodes by a broker-less type publishing/subscribing model, the configuration management method comprising:
receiving communication data among the plurality of nodes;
based on the communication data, creating first relationship information indicating a relationship among the nodes regarding transmission and reception of the communication data, second relationship information indicating a relationship among the nodes regarding a belonging domain and whether the nodes are on a publisher side or on a subscriber side, and third relationship information indicating a relationship among the nodes regarding a topic to be published and subscribed; and
creating configuration information indicating a network configuration of the communication system by associating the first relationship information, the second relationship information, and the third relationship information.

* * * * *